US006245195B1

(12) United States Patent
Marwah

(10) Patent No.: US 6,245,195 B1
(45) Date of Patent: Jun. 12, 2001

(54) DECONTAMINATION OF WASTE PAPERS

(75) Inventor: Nipun Marwah, Mt. Pleasant, SC (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 09/061,373

(22) Filed: Apr. 16, 1998

Related U.S. Application Data

(63) Continuation-in-part of application No. 08/617,560, filed on Mar. 19, 1996, now abandoned.

(51) Int. Cl.[7] .................................................. D21C 5/02
(52) U.S. Cl. ........................................... 162/5; 162/4
(58) Field of Search ........................ 162/5, 55, 4

(56) References Cited

U.S. PATENT DOCUMENTS

| | | | |
|---|---|---|---|
| 3,635,788 | * | 1/1972 | Braun et al. .............................. 162/4 |
| 5,200,034 | * | 4/1993 | Richmann et al. ....................... 162/5 |
| 5,340,439 | * | 8/1994 | Markham et al. ........................ 162/5 |
| 5,441,601 | * | 8/1995 | Cosper et al. ............................ 162/5 |
| 5,527,426 | * | 6/1996 | Marwah et al. .......................... 162/5 |
| 5,639,346 | * | 6/1997 | Marwah et al. .......................... 162/5 |

* cited by examiner

*Primary Examiner*—Brenda A. Lamb
(74) *Attorney, Agent, or Firm*—Terry B. McDaniel; Daniel B. Reece, IV; Richard L. Schmalz

(57) ABSTRACT

An improved process is disclosed for removing nonimpact inks and stickies contaminants from waste paper containing same by repulping the waste paper to form a slurry, adding a densifying agent and an agglomeration agent to the slurry, and subjecting the slurry to treatment with a conical cleaner to remove the inks/stickies. The densifying agent and agglomeration agent addition may be simultaneous or the densifying agent addition may precede agglomeration agent addition and, preferably, is conducted at ambient or greater temperature, at neutral to alkaline pH, and at a pulp consistency (below 18%). Densifying agent addition and agglomeration, followed by passing the repulped waste paper through a conical cleaner, provides improved ink removal over passing the slurry through a conical cleaner without such pre-treatment or with treatment only with densifying agent or only with agglomeration agent. Also, the process may be employed as an additional step in a conventional process for removing inks from reprographic printed papers, such as ink removal by screening, flotation, centrifugal cleaning, washing, and sedimentation with or without decantation. When the densifying agent is magnetite, the process may be employed with magnetic removal as an additional step.

9 Claims, 2 Drawing Sheets

DECONTAMINATION OF WASTE PAPERS

This application is a continuation-in-part of application Ser. No. 08/617,560, filed Mar. 19, 1996, now abandoned.

BACKGROUND OF THE INVENTION

1. Field of the Invention

The present invention relates to a method of decontaminating waste paper (secondary fiber). More particularly, this invention relates to cleaning, for the purpose of recycling, secondary fibers contaminated with non-impact inks and/or stickies by introducing a densifying agent and an agglomerating agent into a slurry of the waste paper fibers, followed by passing the slurry through a centrifugal cleaner.

2. Description of Related Art (Including Information Disclosed Under 37 CFR 1.97 and 37 CFR 1.98)

Waste paper, also known as secondary fiber, has long served as a source of raw fiber material in papermaking. Waste paper materials invariably contain one or more contaminants including inks, dye colors, fluorescent whitening agents, and "stickies" (sticky or tacky contaminants including adhesives, binders, plastic films, coatings, waxes, and the like). Sorted waste paper has had most of these contaminated papers removed and represents a higher, more expensive grade of waste paper. The growing utilization of secondary fibers in many types of paper products has made it necessary for paper manufacturers to process lower grades of waste paper (i.e., unsorted waste paper). While various methods have been employed to remove the contaminants to permit incorporation of the secondary fibers with virgin pulp in papermaking, such lower grade furnish is more heterogeneous and typically contains significantly more contaminants than a higher quality waste paper. Conventional treatment methods may not be adequate to permit incorporation of a significant percentage of unsorted waste papers.

Current approaches to processing recycled fibers can be classified as repulping (slushing of fibers and partial detachment of ink/contaminants from fibers), coarse and fine screening (separation of fibers from contaminants by size and shape), centrifugal cleaning (separation based on density differences relative to fibers), flotation (separation by preferential adsorption of detached ink/contaminants onto air bubbles), washing (separation of small entrained particles from fibers by relative flow of water passing by fibers), and dispersion (reduction in size of ink/contaminants by mechanical action). There is an optimum particle size range for separation of particles from fibers in each of these processes. Depending upon the specific cleanliness requirements for the deinked pulp, it takes a combination of most or all of these processes to cover the size range of particles that one typically encounters. Both the washing and flotation processes depend on the proper use of surfactants. Depending on the relative strength and size of the hydrophillic versus hydrophobic portion of the surfactant molecule, the surfactant will cluster around ink and other contaminant particles, rendering the particles hydrophylic for washing purposes or more hydrophobic for flotation. The opposing natures of washing surfactants and flotation surfactants can cause problems in combination flotation/washing systems.

Certain specific removal approaches have been disclosed for specific waste paper contaminants:

U.S. Pat. No. 5,211,809 discloses removing color from dyes from secondary pulps with non-chlorine based bleaching agents in treating sequences using oxygen with combinations of peroxide, ozone, and/or hydrosulfite at controlled pH conditions.

U.S. Pat. No. 5,213,661 teaches using oxygen to reduce the tackiness of stickies in secondary pulps and, optionally, using oxygen with alkali and/or detackification agents for optimum stickies control. U.S. Pat. No. 5,080,759 teaches introducing a water-soluble organotitanium compound into the water system of a papermaking process containing the secondary fiber to reduce the tackiness and adhesive properties of the stickies contaminants.

Also, published Japanese Patent Application No. HEI 3[1991]-199477 teaches a method of recycling used paper containing either fluorescent white paper or colored paper or both by introducing ozone into a dispersed slurry of said used paper.

The effectiveness of contaminant (ink/stickies) removal strategies usually is determined by a combination of TAPPI dirt counts (to quantify larger specks), brightness readings, and image analysis. Image analysis involves the imaging of the surface of a handsheet or piece of paper, followed by digitization of this image by a computer. The resolution is set by specifying the minimum number of pixels that a particle must cover to be represented accurately. The output from the analysis is the total area of contaminant particles above a resolvable size on the surface of the paper sample. The limit of visibility for particles is about 40 micrometers. The standard limit for writing printing grades is less than 5 ppm.

While waste paper contaminants such as dyes, whiteners, and stickies present real problems in recycling, the most common removal problem is with inks. Printing inks have been classified broadly as impact and nonimpact inks.

Impact inks are used in conventional printing processes such as letterpress, flexography, and lithography. These inks are pressed or laid onto the paper but do not fuse with it. They generally consist of a pigment suspended in an oil-based alkaline aqueous medium. The paper industry has been successfully deinking papers containing impact inks for years using washing and/or flotation type systems.

Also, U.S. Pat. No. 4,381,969 teaches bleaching waste paper containing encapsulated constituents such as inks by repulping the waste paper in the presence of an aqueous alkaline solution which contains a peroxide compound such as hydrogen peroxide.

Other patents disclosing deinking methods include:
U.S. Pat. No. 4,013,505, "Method of Deinking Printed Wastepapers";
U.S. Pat. No. 4,076,578, "Ink Removal From Waste Paper";
U.S. Pat. No. 4,147,616, "Apparatus for Deinking Printed Wastepaper";
U.S. Pat. No. 4,780,179, "Method for Producing Pulp from Printed Unselected Waste Paper";
U.S. Pat. No. 5,151,155, "Process for Deinking Wastepaper with Organically Modified Smectite Clay";
U.S. Pat. No. 5,221,433, "Deinking Wastepaper Using Alkoxylation Product of Carboxylic Acid Containing an OH Group and Alkylene Oxide";
U.S. Pat. No. 5,225,046, "Wastepaper Deinking Process";
U.S. Pat. No. 5,227,019, "Wastepaper Deiitling Process";
U.S. Pat. No. 5,228,953, "Deinking Waste Paper Using a Polyglycol and a Phosphoric Ester Mixture"; and
U.S. Pat. No. 5,238,538, "Method for Deinking Recycled Fiber by Applying Direct Current Electric Field."

Increasing amounts of secondary fiber, however, are generated from papers subjected to reprographic printing processes such as electro-photographic copying (e.g., xerography) and laser printing. These printing methods employ nonimpact inks. Nonimpact inks are comprised of a pigment and a thermoplastic resin. The resin is a bonding agent which fuses the pigment to the sheet and to other pigment particles. The pigments employed in nonimpact inks can be categorized as either iron-based or non-iron based (e.g., carbon based). The resin polymers become cross-linked and resistant to chemical and mechanical action, making nonimpact printed papers difficult to deink by conventional deinking processes. Once detached from the fibers the toner ink particles tend toward a size which is larger than that which can be efficiently handled by flotation or washing and too small to be removed by cleaners and screens. Various approaches have been disclosed specifically to remove reprographic type inks:

U.S. Pat. No. 4,276,118, "Deinking Waste Electrophotography Copy Paper";

U.S. Pat. No. 4,561,933, "Xerographics Deirking";

U.S. Pat. No. 5,141,598, "Process and Composition for Deinking Dry Toner Electrostatic Printed Wastepaper"; and U.S. Pat. No. 5,217,573, "Removal of Laser Printer and Xerographic Ink from Recycle Paper."

Conventional deinking processes require high energy input and employ additives or solvents to assist the removal of reprographic (nonimpact) type inks. Significant fiber loss normally results along with the ink removal. To employ this class of papers economically for recycling to higher grade, bright papers, a method is needed which removes the inks while retaining the fiber. Unfortunately, known ink removal processes, when employed to remove nonimpact inks, have the following common disadvantages:

high fiber loss (20–25%)

high solid waste high capital costs (due to large equipment requirement)

low ink removal efficiency

The polymerized nature of fused xerographic and laser inks from recycle non-impact printed papers which make such papers difficult to deink by conventional washing and flotation methods is that a significant portion of the detached laser ink particles, upon repulping, will be larger than 150 microns; and, therefore, will not be effectively removed by washing and flotation systems. The shape of the individual particles is generally flat and plate-like with densities slightly less than water, so centrifugal cleaning is also not very effective. Their shapes, in addition to their relatively small size, cause removal difficulties in screens and cleaners (Only the larger particles will be effectively screened.). While dispersion (via refining) can reduce the size of the ink particles to provide more effective removal by washing, such refining is energy intensive, and it increases the drainage problems already inherent in the use of recovered fiber on paper machines.

A chemical approach to this problem has been to chemically modify the laser inks to allow their removal in standard forward cleaners. The process changes the shapes of the particles from plate-like to spheres, and the density of the spheres is increased to values in the range of 1.0 to slightly above 1.0 g/cc. The change of shape and enhanced density allow for improved removal of these inks by conventional forward cleaners. The disadvantage of this chemical approach is that ink removal efficiencies are in the range of 95–97%, with high levels of the smaller ink particles eluding chemical densification and removal.

A novel approach to overcome the above-noted disadvantages of conventional ink removal methods for reprographic ink removal is provided in U.S. Pat. No. 5,527,426, published Jun. 18, 1996 and commonly owned with the instant application. The patentees teach adding magnetite and an agglomerant to the repulped slurry so that non-iron based inks, as well as iron based inks, can be magnetically removed. Industrial magnets, however, are not standard equipment in most paper mills; so a more desirable method of ink contaminant removal would be one which relied on traditional paper mill equipment.

While waste paper contaminants such as xerographic inks present real problems in recycling, stickies present unique problems due to their non-magnetic character and to their different chemistry and physical properties (e.g., high tackiness) compared to both impact and nonimpact inks, whether magnetic or non-magnetic. In paper recycling, sticky contaminants, such as hot melt adhesives, latex, pressure-sensitive adhesives, and wax, pose considerable problems to papermakers. When present in unacceptable amounts, stickies can cause problems with both paper machine operation and product quality. This problem has been addressed recently by the prior art.

In U.S. Pat. No. 5,639,346, published on Jun. 17, 1997 and commonly-owned with the instant application, the patentees disclosed a method of magnetic removal of stickies by introducing magnetite and an agglomerant to facilitate removal of the agglomerated magnetite- stickies particles by passing the slurry by a magnetic field. Again, such a solution requires additional, non-standard paper mill equipment.

The object of this application is to provide a novel decontamination process for application to waste paper furnishes containing either ink contaminants, whether iron-based or noniron-based, or stickies contaminants, or both. It is a further object of the invention of this application to provide a deinking process solely reliant on conventional equipment. Particularly, it is an object of this application to provide a centifugal cleaning process of improved efficiency in the removal of nonimpact printing inks or stickies or both.

SUMMARY OF THE INVENTION

The objects of the invention are achieved by repulping waste paper which includes paper printed with non-impact inks, such as reprographic printed papers printed with inks, which may or may not be magnetic, or stickies or both of said contaminants, adding a densifying agent, such as silica or magnetite, and an agglomerating agent to the pulp slurry to provide agglomerated ink particles (or agglomerated stickies particles or both) of enhanced density and passing the treated, pulped waste paper through a centrifugal cleaner. Any impact inks, which are almost always present in mixed office waste, will also be removed as they will attach to the stickies or to the resin component of the non-impact ink and become a part of the agglomerated particle. The densifying agent/agglomerant treatment and centrifugal cleaning of the repulped waste paper can be practiced alone or as an additional treatment in a conventional process for removing inks and/or stickies from reprographic printed papers, such as removal by magnetic deinking (when the densifying agent is magnetite), screening, flotation, centrifugal cleaning, washing and sedimentation and/or decantation.

DESCRIPTION OF THE PREFERRED EMBODIMENT(S)

Figure 1:
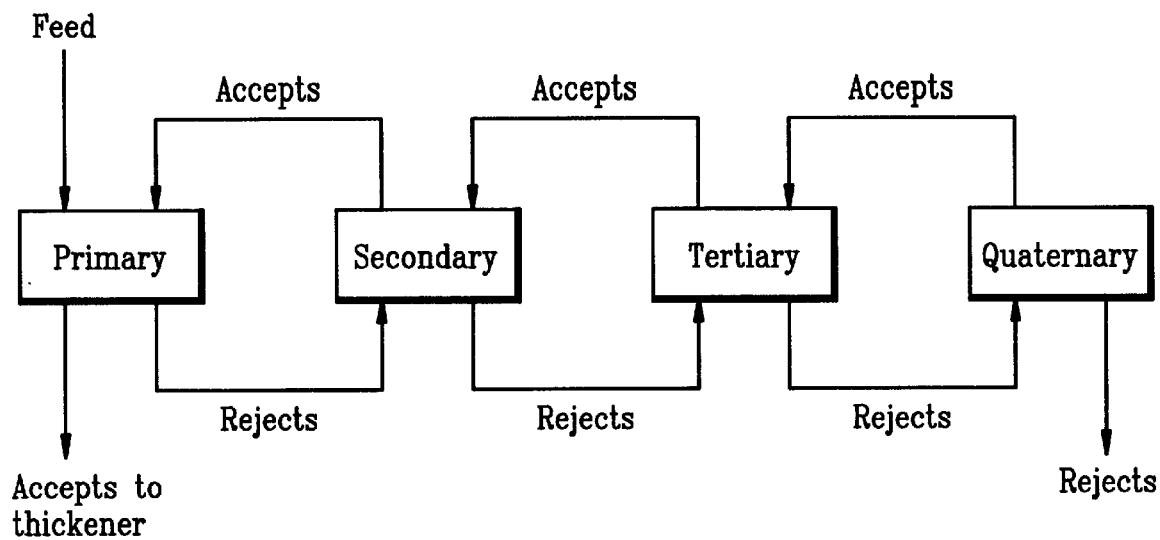
FIG. 1 shows a commercial one-forward-pass cleaning system for deinking repulped waste papers.

Contaminate removal from recycle waste paper pulp, where the contaminants include inks or stickies (or both) is facilitated by the addition of a densifying agent, such as fine silica (sand) or a metal particulate material, such as magnetite, in addition to an agglomerant, to the repulped waste paper slurry and then passing the treated slurry through a centrifugal cleaner. The invention process results in incorporation of the densifying agent within the agglomerated ink particles (even the smaller particles) such that the ink/densifying agent particle (or stickies/densifying agent particle) agglomerates (versus agglomerated ink or stickies particles alone) such that the agglomerated particle density is sufficient to allow much enhanced contaminant removal upon passing the treated waste paper slurry through the centrifugal cleaner. The densifying agent preferably exhibits a density of greater than 1.0 g/cc. More preferably, it may exhibit a density of greater than 2.0 g/cc.

While the simultaneous addition to the pulp slurry of densifying agent and agglomerating agent results in incorporation of the densifying agent within the ink/densifying particle agglomerate particles (or the stickies/densifying particle agglomerate), such phenomena may be further enhanced by sequential addition to the repulped slurry of densifying agent and agglomerating agent, respectively. It is critical to the achievement of such encapsulation, however, that the agglomerating agent not be added prior to the densifying agent. This results in early agglomerant formation with any later added densifying agent merely "coating" the agglomerated particles and impeding any further agglomeration, thus limiting agglomerant particle size and defeating the purpose of removal in the cyclonic cleaner.

U.S. Pat. No. 5,340,439 discloses a process using a cyclonic cleaner for removing "toner, ink or the like from paper" by (1) pulping the printed paper with water to a slurry consistency of 1–20% under controlled conditions of pH and temperature, (2) adding an agglomerating agent, (3) pulping the slurry for 5–90 minutes, (3) adding talc, and (4) using a cyclonic cleaner to remove the agglomerated ink particles by screening. A significant limitation to the effectiveness of this process is the teaching that the agglomerating agent must be added a significant amount of time before adding the talc, which is described as a densifier. The patentees teach that the talc coats the agglomerated particle. While this may enhance the density of the particle, the order of addition can severely limit particle size, which is an important concern in removal by screening using a cyclonic cleaner. Whereas the present invention requirement of simultaneous addition of densifying agent and agglomerating agent, or the sequential addition of densifying agent first and then of agglomerating agent permits the densifying agent to bond to the resin containing ink particles or to the stickies particles such that the particles so formed, upon addition of the agglomerating agent, are encapsulated within the agglomerated ink/densifying agent particles or the agglomerated stickies/densifying agent particles. Thus, the densifying agent component of the particles do not "coat" to inhibit further agglomeration or other particle formation or size enhancement.

As centrifugal separation is a physical rather than a chemical process and only particulate material is susceptible thereto, the most efficient ink removal should involve a pretreatment to separate any fused or bound inks from the repulped fibers. Use of the invention densifying agent/agglomerant addition, followed by passing the treated slurry through a centrifugal cleaner permits consistent high efficiency stickies/ink removal in waste non-impact printed papers containing stickies and xerographic and laser inks consisting of various levels of carbon-based and/or iron-based inks. Any solid particle in the feed to a centrifugal cleaner is subjected to four different forces: centrifugal, buoyancy, drag, and lift. Except for the centrifugal force which is directed away from the center of the cleaner, all other forces are directed toward the center of the cleaner body. Typically, the particles moving away from the center are removed or rejected while particles moving towards the center are collected as accepts. Thus, increasing the centrifugal force on the particle as compared to the other three forces, improves particle removal.

In the pulping industry, pulp consistency (in water) is described generally as high (>18%), medium (7–18%), or low (<7%). While the invention disclosed herein may operate at high, medium, or low consistency, agglomerated particle pathways for removal from the slurry are less blocked at medium consistencies and are least blocked at low consistencies. Therefore, the invention process is preferably operated at medium slurry consistency and most preferably operated at low slurry consistency.

The following examples describe such treatment and provide an evaluation of the combination of densifying agent and agglomeration agent addition to the waste paper pulp slurry. These examples are provided for purposes of illustration and are not to be construed as limiting the invention.

EXAMPLE 1

To assure similar ink removal is achieved to conduct density comparisons, recovered papers containing high levels of xerographic and laser inks (about 70% iron-based) were hydrapulped at 10% consistency, 10.5 pH, and 65° C. for 15 minutes. The pulp (100 oven-dried grams) was pretreated with either (I) agglomerant chemical (to simulate the conventional approach) or (II) agglomerant chemical and magnetite (trial) blend at 6% consistency in a British disintegrator at about 70° C. for about 30 minutes. In order to facilitate collection of the removed ink for density studies, the pretreated pulp was further diluted and deinked by a permanent magnet. The ink retained on the magnet was collected from each pretreatment condition and dried under vacuum and anhydrous phosphorus pentaoxide. The picnometer method was used to measure densities (using mineral oil as the reference liquid). Density results are shown in Table I.

TABLE I

| Treatment Condition | Pretreatment | | | Density of Post Agglomerated Particles, g/cc |
| --- | --- | --- | --- | --- |
| | Agglomerant % | Magnetite % | Caustic % | |
| I | 0.5 | 0 | 0.5 | 1.1 |
| II | 0.5 | 0.25 | 0.5 | 1.4 |

The data show that particles which had been subjected to magnetite-based pretreatment had significantly higher densities as compared to the particles pretreated with agglomerant alone. Thus, the addition of magnetite increased the density of the agglomerated ink particle densities by approximately 30%. Improved centrifugal cleaning will result not only from making the larger or medium sized agglomerated particles more responsive to centrifugal forces, it results in collection in the cleaner of smaller agglomerated particles which, absent the enhancement of their densities, would otherwise not be affected by the centrifugal forces to result in their separation and removal.

EXAMPLE 2

Figure 2:
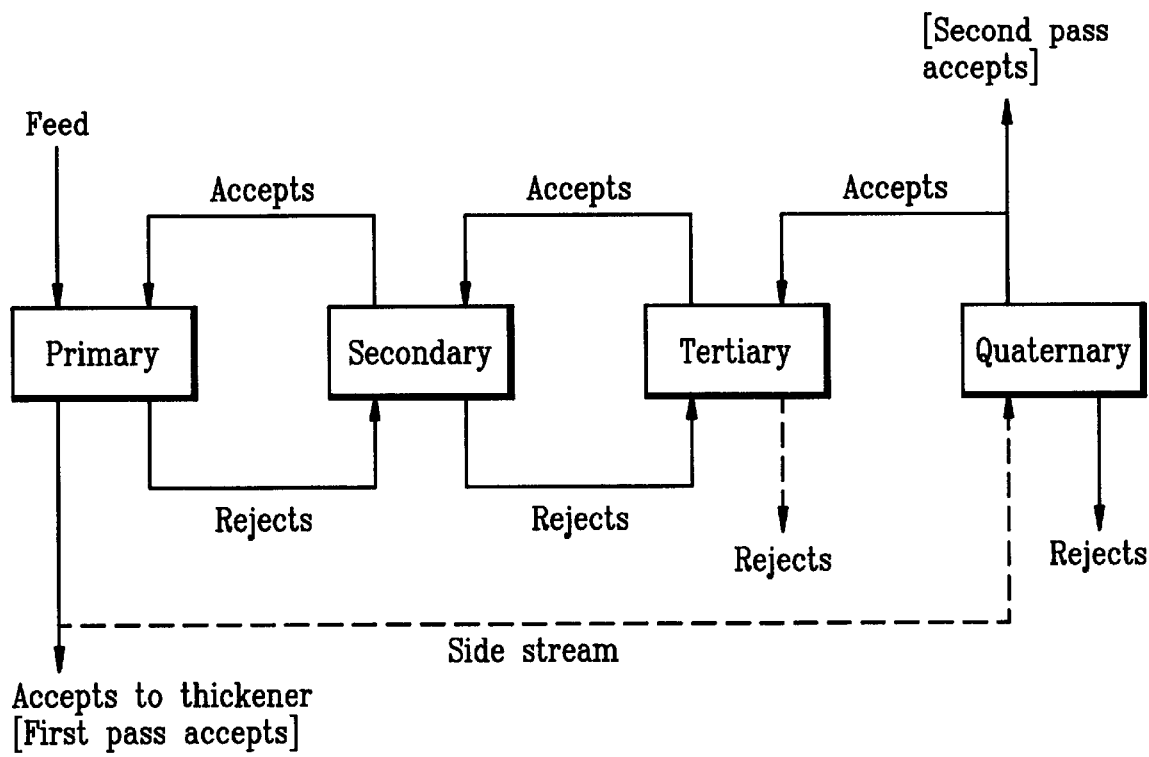
FIG. 2 shows a modification of the system of FIG. 1 to simulate a two-pass forward cleaning system.

The invention improved decontamination process was conducted on a commercial scale to determine deinking efficiency. This was accomplished by modifying an existing deinking system by using an existing quaternary forward cleaner to simulate a second pass of forward cleaning. FIG. 1 represents the existing one-forward-cleaning pass cleaner system, and FIG. 2 shows the adaptation thereof to simulate the two-pass cleaner system. Reference to these figures shows how the flow through the cleaners was reconfigured so that the quaternary cleaner was fed a side stream of pulp from the existing primary forward cleaner (first stage) accepts which typically contains pulp at 0.5% consistency.

Figure 3:
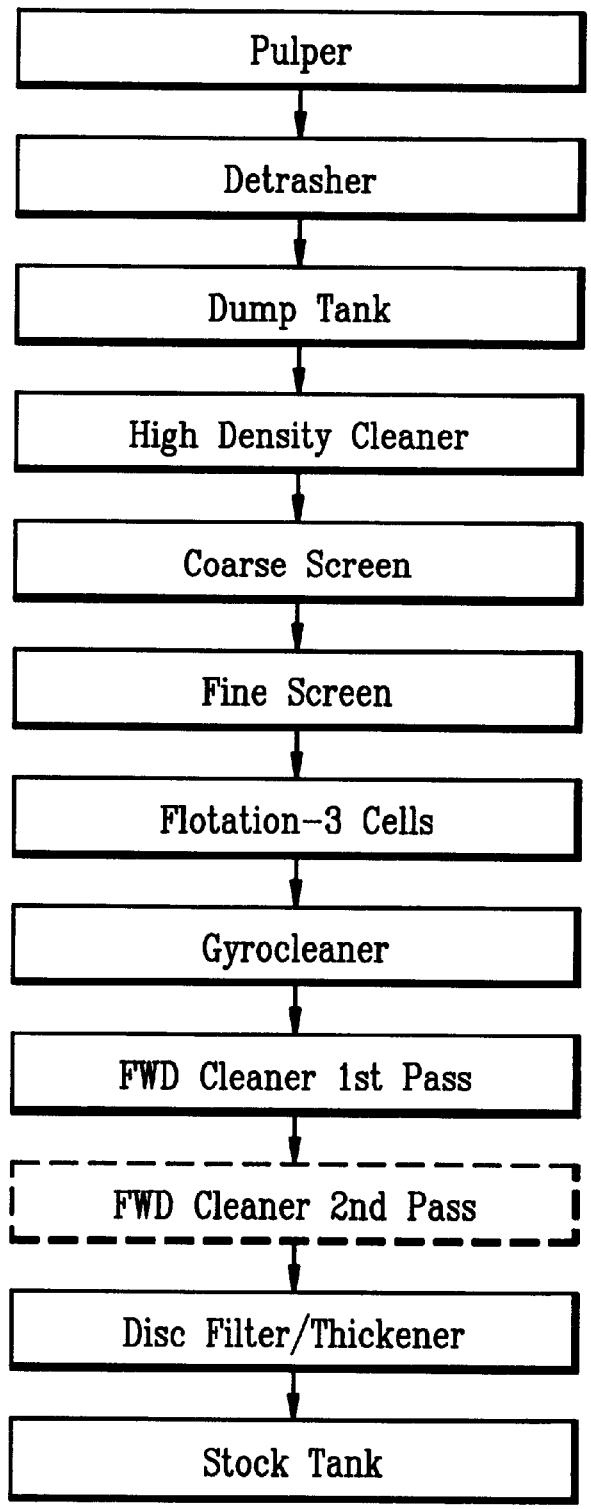
FIG. 3 shows a schematic of the best mode invention decontamination system providing multiple passes of pre-treated repulped slurry through forward cleaners.

The ink removal efficiency of the simulated, magnetite/agglomerant pretreatment, two-pass forward cleaning system was evaluated on a laser ink containing sorted white ledger (SWL) furnish. A four ton batch of the SWL was hydrapulped and pretreated with 0.125% magnetite, 0.5% agglomerant (Betz 231) and 0.5% caustic at 13% consistency and 70° C. The resulting repulped/pretreated pulp was pumped into a dump tank and diluted to 2% at the coarse screens, 1% at the flotation cells (treated with Betz RPA-248 flotation agent), and then 0.5% when subjected to deinking in two passes of forward cleaning. A schematic of the deinking system used is shown in FIG. 3. Some batches were processed without the second pass of forward cleaning. Deinked samples were made into TAPPI handsheets and tested for brightness and residual ink. Ink content reported (analysis performed on Optomax V image analyzer) is based on area of ink particles greater than 80 microns in diameter. Deinking results are reported in Table II.

TABLE II

| FWD cleaner pass | Cleaner consistency % | Ink Content, ppm[a] Feed | Ink Content, ppm[a] Accepts | Ink Removal %[b] |
|---|---|---|---|---|
| first | 0.5 | 278 | 28 | 90 |
| second | 0.5 | 28 | 0 | 100 |

[a]Ink content based on area of ink particles 80+ microns in diameter
[b]Ink removal based on difference between the feed and accepts ink content divided by the feed ink content Ink removal efficiency across the first and second pass forward cleaners was 90% and 100%, respectively. Ink content in the first cleaner was reduced from 278 to 28 ppm. The second pass cleaner reduced the ink levels to zero ppm.

EXAMPLE 3

In order to show the improvements in stickies removal resulting from the instant method, pulps containing either 1 or 2% of various "stickies" contaminants were reslurried. When agglomeration agent alone was added to the slurry (i.e., no densifying agent), the post-agglomerated particle density was 1.0 or less than 1.0. However, when magnitude was added along with the agglomerant, the agglomerants resulted in densities greater than 1, as reported in Table III.

TABLE III

| Type Stickies | % Stickies in furnish | Treatment Temperature (° C.) | Density |
|---|---|---|---|
| PSA | 2 | 60 | 1.2–1.25 |
| HMS | 1 | 80 | 1.1 |
| NSA-B | 1 | 60 | 1.1 |
| NSA-D | 1 | 75 | 1.1 | agglomerant = 0.50%–0.75%; polymer/magnetite blend = 0.5%
PSA = pressure sensitive adhesives
HMS = hot melts
NSA = National Starch Adhesives The increase in densities noted above, resulting from stickies-magnetite attachment, will cause the agglomerated particles to experience relatively higher centrifugal force, thereby resulting in improved removal in centrifugal cleaners.

That which the applicants consider to be the subject matter of their invention is:

(1) A process for deinking waste paper contaminated with a member of the group consisting of nonimpact printing inks and stickies comprising the steps of:
  (a) repulping the waste paper to form a slurry;
  (b) treating the slurry simultaneously with a densifying agent and an agglomeration agent; and
  (c) passing the treated slurry through a conical cleaner;
(2) the process of (1) wherein, in step (b), the densifying agent is added prior to addition of the agglomeration agent;
(3) the process of (1) wherein the addition of densifying agent and agglomeration agent is conducted at ambient or higher temperatures, at pulp consistencies below 18%, and at neutral to alkaline pH;
(4) the process of (2) wherein the addition of densifying agent and agglomeration agent is conducted at ambient or higher temperatures, at pulp consistencies below 18%, and at neutral to alkaline pH;
(5) the process of (3) wherein the pulp consistency is below 7%;
(6) the process of (4) wherein the pulp consistency is below 7%;
(7) the process of (5) wherein the densifying agent exhibits a density of greater than 1.0 g/cc;
(8) the process of (6) wherein the densifying agent exhibits a density of greater than 1.0 g/cc;
(9) the process of claim 7 wherein the densifying agent is selected from the group consisting of metal particulate material and silica;
(10) the process of claim 8 wherein the densifying agent is selected from the group consisting of metal particulate material and silica:
(11) the process of (9) wherein the metal particulate material is magnetite;
(12) the process of (11) wherein the metal particulate material is magnetite;
(13) the process of (12) wherein the magnetite and agglomeration agent addition is conducted at from about 25° to about 65° C., at a pH of from about 7.0 to about 11.0, and at a consistency of from about 0.3 to 2.0%;
(14) the process of (12) wherein the magnetite and agglomeration agent addition is conducted at from about 25° to about 65° C., at a pH of from about 7.0 to about 11.0, and at a consistency of from about 0.3 to 2.0%;
(15) the process of (1) further comprising an additional slurry treatment step selected from the group consisting of screening, flotation, centrifugal cleaning, washing and sedimentation/decantation, or a combination thereof;
(16) the process of (2) further comprising an additional slurry treatment step selected from the group consisting of screening, flotation, centrifugal cleaning, washing and sedimentation/decantation, or a combination thereof;
(17) the process of (15) wherein the additional treatment step is flotation;
(18) the process of (16) wherein the additional treatment step is flotation;

(19) the process of (17) wherein the flotation step occurs prior to step (2);

(20) the process of (18) wherein the flotation step occurs prior to step (2);

(21) the process of (19) wherein the treated slurry product of step (2) is subjected to multiple passes through the conical cleaner in step (3);

(22) the process of (20) wherein the treated slurry product of step (2) is subjected to multiple passes through a conical cleaner;

(23) the process of (9) comprising an additional slurry treatment step of subjecting the slurry to a magnetic field;

(24) the process of (11) comprising an additional slurry treatment step of subjecting the slurry to a magnetic field.

As will be appreciated by those skilled in the art, the present invention may be embodied in other specific forms without departing from the spirit or essential attributes thereof, and, accordingly, reference should be made to the appended claims, rather than to the foregoing specification, as indicating the scope of the invention.

What is claimed is:

1. A process for removing inks and stickies from waste paper contaminated with non-impact printing inks and stickies comprising the steps of:

(1) repulping the waste paper to form a slurry;

(2) sequentially adding to the slurry a densifying agent, exhibiting a density greater than 2.0 g/cc, followed by an agglomeration agent to form a treated slurry; and (3) passing the treated slurry through a conical cleaner whereby the non-impact inks and stickies from the contaminated waste paper are removed, wherein the densifying agent is a polymer/magnetite blend.

2. The process of claim 1 wherein the addition of densifying agent and agglomeration agent is conducted at ambient or higher temperatures, at pulp consistencies below 18%, and at neutral to alkaline pH.

3. The process of claim 2 wherein the pulp consistency is below 7%.

4. The process of claim 1 wherein the polymer/magnetite blend and agglomeration agent addition is conducted at a temperature of about 25° to about 65° C., at a pH from about 7.0 to about 11.0, and at a pulp consistency of from about 0.3 to 2.0%.

5. The process of claim 1 further comprising an additional slurry treatment step selected from the group consisting of screening, flotation, centrifugal cleaning, washing and sedimentation/decantation, or a combination thereof.

6. The process of claim 5 wherein the additional treatment step is flotation.

7. The process of claim 6 wherein the flotation step occurs prior to step (2).

8. The process of claim 7 wherein the treated slurry is subjected to multiple passes through the conical cleaner in step (3).

9. The process of claim 1 comprising an additional slurry treatment step of subjecting the treated slurry to a magnetic field.

* * * * *